United States Patent [19]

Tajima

[11] 4,380,847
[45] Apr. 26, 1983

[54] DEVICE FOR MOUNTING GAS SPRING FOR OPENING AUTOMOBILE HATCH DOOR

[75] Inventor: Yasuari Tajima, Gyoda, Japan

[73] Assignee: Showa Manufacturing Co., Ltd., Tokyo, Japan

[21] Appl. No.: 223,308

[22] Filed: Jan. 8, 1981

[30] Foreign Application Priority Data

Jul. 3, 1980 [JP] Japan ............................ 55-92938[U]

[51] Int. Cl.³ ............................ E05F 5/08; F16D 3/00
[52] U.S. Cl. ........................................ 16/85; 248/624; 403/229
[58] Field of Search ................... 16/82, 85, 63, 65, 72, 16/76, 77, 281, 285, 287, 289; 403/229; 248/623, 624, 625; 292/262, 338; 267/166, 167, 170, 177, 179

[56] References Cited

U.S. PATENT DOCUMENTS 2,352,318 6/1944 Guarnaschelli ................... 248/624

FOREIGN PATENT DOCUMENTS 763616 12/1956 United Kingdom ................ 403/229

Primary Examiner—Paul A. Bell
Assistant Examiner—John S. Brown
Attorney, Agent, or Firm—A. W. Breiner

[57] ABSTRACT

A device for mounting a gas spring for opening the hatch door or the like of an automobile which is produced by helically winding one elastic wire is described. The gas spring mounting device includes a mounting end, which is helically wound with the same pitch as the diameter of the wire for rotatable fitting onto a bolt anchored at either the door mounting base of the car or the door itself; a flexible portion, which is helically wound with a slightly larger pitch than the diameter of the wire and having an axis at a right angle with respect to the axis of said mounting end; and a gas spring connecting portion which is wound with the same pitch as the diameter of the wire for connection to a thread formed in the end portion of the gas spring. Since the described gas spring mounting device is made of the single wire, it can be produced at lower cost.

5 Claims, 6 Drawing Figures

DEVICE FOR MOUNTING GAS SPRING FOR OPENING AUTOMOBILE HATCH DOOR

BACKGROUND OF THE INVENTION

1. Field of the Invention

The present invention relates to a device for mounting a gas spring for opening the hatch door or the like of an automobile.

2. Description of the Prior Art

In a gas spring 3 for opening the hatch door 2 or the like of an automobile, as shown in FIGS. 1 and 2, a piston is slidably fitted in an oil cylinder 4 to provide a hydraulic shock absorbing mechanism, and a gas under high pressure is confined in the cylinder 4 to provide a spring action. When the lock of the door 2 is released, the door 2 is opened through actuation of the gas spring 3. When the door 2 is pushed down, it is closed through the compression of the spring.

The end portions of the cylinder 4 and the piston rod 5 of the gas spring 3 thus constructed are connected to the car body by means of fixtures, i.e., a door mounting base 1 and to the door 2 in order that the gas spring 3 has its axis inclined at an angle α with respect to plane p which is at a right angle with respect to the axis of a hinge 7 connecting the door 2 to the base 1 in an openable manner.

As the mounting device for mounting the end portions of the cylinder and piston rod of the gas spring upon the mounting base and the door, according to the prior art, a universal joint has been used. This universal joint is not fully satisfactory since it has a complicated construction and a high cost.

SUMMARY OF THE INVENTION

According to a major feature of the present invention, a device for mounting a gas spring is provided constructed from one elastic wire. The elastic wire is composed of a helically wound mounting end, which is to be rotatably fitted on a bolt anchored at either a door mounting base or a hatch door, and a helically wound flexible and gas spring connecting portions. The helical winds of the wire on the spring engaging portion have an axis at a right angle with respect to the axis of the mounting end.

The mounting end and the gas spring connecting portion are wound with the same pitch as the diameter of the wire; whereas the flexible portion is wound with a slightly larger pitch than the diameter of the wire.

It is, therefore, an object of the present invention to provide a gas spring mounting device which can be easily produced at a low cost without need for a universal joint, according to the prior art.

Further objects, advantages, and features of the present invention will become more fully apparent from a detailed consideration of the arrangement and construction of the constituent parts as set forth in the following specification taken together with the accompanying drawing.

DESCRIPTION OF THE PREFERRED EMBODIMENT

Figure 1:
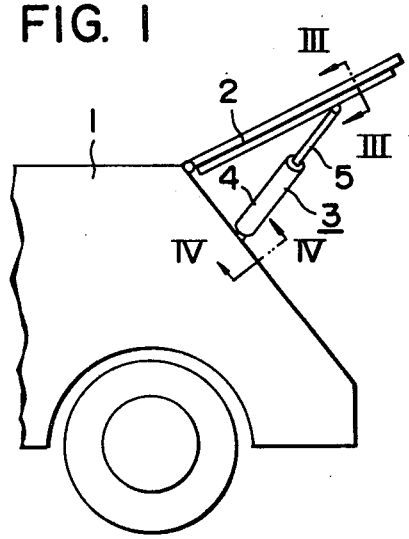
FIG. 1 is a fragmented view showing the hatch door portion of an automobile which is equipped with a gas spring having the ends of the spring connected to the car body and the door by means of mounting devices.

A mounting device 6 of the present invention for connecting the end portions of a cylinder 4 and a piston rod 5 to a door mounting base 1 and a door 2 is produced by helically winding a single elastic wire.

More specifically, the wire is composed of a mounting end 8, which is closely wound several times in a helical shape with the same pitch as the diameter of the wire proper; a flexible portion 9, which is wound several times with a slightly larger pitch than the diameter of the wire proper about an axis r and arranged at a righ angle with respect to the axis q of the mounting end 8; and a connecting portion 10 which is closely wound with the same pitch as the diameter of the aforementioned wire about the same axis as the aforementioned axis r.

Figure 2:
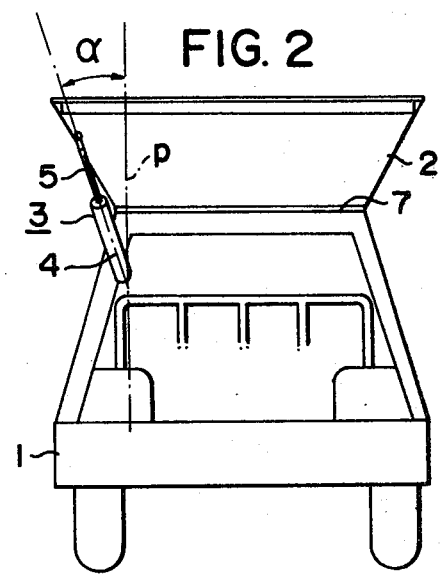
FIG. 2 is a front elevation of FIG. 1.
Figure 3:
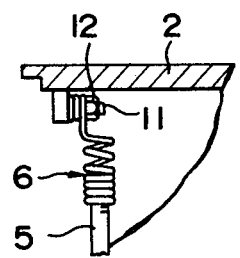
FIG. 3 is a section taken along line III—III of FIG. 1 and shows one embodiment of the mounting device according to the present invention.
Figure 4:
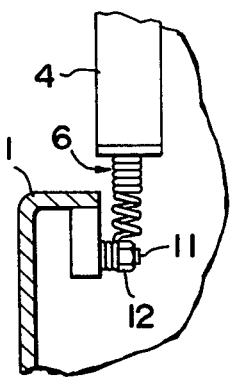
FIG. 4 is a section taken along line IV—IV of FIG. 1.
Figure 5:
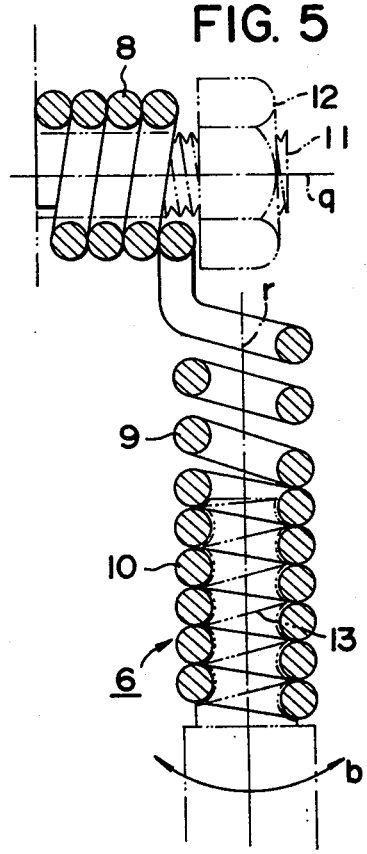
FIG. 5 is a longitudinal section showing the mounting device of FIGS. 3 and 4.
Figure 6:
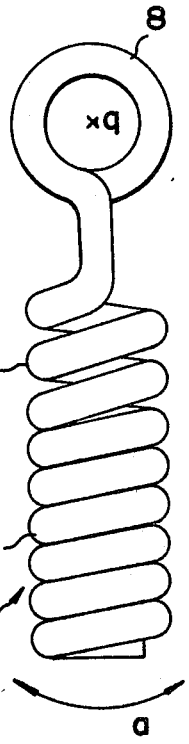
FIG. 6 is a front elevation of FIG. 5.

The mounting end 8 of the mounting device 6 thus produced is rotatably fitted on a bolt 11, which is anchored at the door 2 or the base 1, and is prevented from coming out by means of a nut 12, and either the leading end of the piston rod 5 or the supporting column protruding from the end portion of the cylinder 4 is formed with a thread 13, in which the connecting portion 10 is screwed. As a result, when the door 2 is opened or closed, the gas spring 3 is turned in the aforementioned plane p (as shown in FIG. 2) and in the direction normal to that plane. For the rotations in the aforementioned plane p, however, the mounting device 6 can freely rotate about the axis q, as indicated at arrow a in FIG. 6. For the rotations at a right angle with respect to the plane p, i.e., for the rotations indicated at arrow b in FIG. 5, on the other hand, the gas spring 3 can respond through the bending motion of the flexible portion 9 so that the door can be opened and closed smoothly without difficulty.

As has been described hereinbefore, the mounting device according to the present invention can have its construction simplified merely by helically winding a single wire which can be easily produced at a low cost. The mounting device of the present invention has other advantages in that a gas spring can be easily mounted and the device is of small size.

While the present invention has been described with reference to the particular embodiment thereof, it will be understood that numerous modifications may be made by those skilled in the art without departing from the spirit and scope of the invention as defined in the appended claims.

It is claimed:

1. In combination a gas spring for opening and closing a door; a base member, and a device for mounting to said gas spring and to said base member, said gas spring having means for mounting said mounting device to said spring and said mounting device comprising a single elastic wire wound in a helical shape and including a first wound portion which is rotatably fitted to said base member, and second and third wound portions having their axes at a right angle with respect to the axis of the first wound portion, the first and third wound portions being wound with the same pitch as the diameter of said wire, whereas said second wound portion is wound with a slightly larger pitch than the diameter of said wire thereby providing a flexible portion in said mounting device, and said third wound portion being mounted onto one end of said gas spring.

2. The combination of claim 1 wherein said gas spring is formed at its end portion with a thread and the third wound portion of said mounting device is screwed onto said thread.

3. The combination of claim 1 wherein said base member includes a bolt and said first wound portion of said mounting device is rotatably fitted onto said bolt and anchored thereon by means of a nut.

4. The combination of claim 1 wherein said base member is an automobile door.

5. The combination of claim 1 wherein said base member is a part attached to an automobile.

* * * * *